United States Patent
Dubois et al.

(10) Patent No.: US 12,404,012 B2
(45) Date of Patent: Sep. 2, 2025

(54) AIRCRAFT LANDING GEAR WITH AT LEAST ONE MOTORIZED WHEEL CONFIGURED TO BE POSITIONED CLOSE TO AND REMOTE FROM LANDING GEAR STRUT

(71) Applicant: SAFRAN LANDING SYSTEMS, Velizy-Villacoublay (FR)

(72) Inventors: Sébastien Dubois, Velizy (FR); Philippe Henrion, Velizy (FR); Florent Fortier, Velizy (FR)

(73) Assignee: SAFRAN LANDING SYSTEMS, Velizy Villacoublay (FR)

( * ) Notice: Subject to any disclaimer, the term of this patent is extended or adjusted under 35 U.S.C. 154(b) by 372 days.

(21) Appl. No.: 18/009,260

(22) PCT Filed: Jun. 10, 2021

(86) PCT No.: PCT/EP2021/065620
§ 371 (c)(1),
(2) Date: Dec. 8, 2022

(87) PCT Pub. No.: WO2021/250169
PCT Pub. Date: Dec. 16, 2021

(65) Prior Publication Data
US 2023/0234700 A1    Jul. 27, 2023

(30) Foreign Application Priority Data

Jun. 10, 2020  (FR) .................................... 2006056

(51) Int. Cl.
*B64C 25/32*  (2006.01)
*B64C 25/00*  (2006.01)
(Continued)

(52) U.S. Cl.
CPC ............ *B64C 25/405* (2013.01); *B64C 25/34* (2013.01); *B64C 25/42* (2013.01); *B64C 25/60* (2013.01); *B64C 2025/008* (2013.01)

(58) Field of Classification Search
CPC ....... B64C 25/405; B64C 25/20; B64C 25/22; B64C 25/24; B64C 25/34; B64C 25/36;
(Continued)

(56) References Cited

U.S. PATENT DOCUMENTS

2013/0068884 A1   3/2013  Ducos
2016/0096620 A1   4/2016  Kracke
(Continued)

FOREIGN PATENT DOCUMENTS

EP    0 631 929 A1    1/1995
EP    1 106 501 A1    6/2001
(Continued)

OTHER PUBLICATIONS

International Search Report of PCT/EP2021/065620 dated Aug. 9, 2021 [PCT/ISA/210].

*Primary Examiner* — Arfan Y. Sinaki
(74) *Attorney, Agent, or Firm* — Sughrue Mion, PLLC

(57) ABSTRACT

A landing gear of an aircraft having an upper portion intended to be joined to a structure of the aircraft and a lower portion provided with a first and second axle, the first axle being provided with a braked wheel and the second axle being provided with a motorised wheel, includes a first actuator that moves one of the axles between remote and close positions with respect to the upper portion while the other axle is kept stationary with respect to the upper portion. In one of the remote and close positions, and the wheels on the axles are simultaneously in contact with a running surface while, in the other position, each wheel on the second axle is at a distance from said running surface.

12 Claims, 6 Drawing Sheets

(51) Int. Cl.
  *B64C 25/34* (2006.01)
  *B64C 25/42* (2006.01)
  *B64C 25/60* (2006.01)

(58) Field of Classification Search
  CPC ......... B64C 25/40; B64C 25/42; B64C 25/60;
            B64C 2025/008; B64C 2025/345
  See application file for complete search history.

(56) References Cited

U.S. PATENT DOCUMENTS

2019/0127053 A1* 5/2019 Ravel .................... B64C 25/405
2023/0234700 A1* 7/2023 Dubois .................. B64C 25/34
                                                301/6.2

FOREIGN PATENT DOCUMENTS

| EP | 2 246 253 A2 | 11/2010 |
| FR | 3072943 A1 | 5/2019 |
| GB | 2572161 A | 9/2019 |
| WO | 99/47416 A1 | 9/1999 |

* cited by examiner

AIRCRAFT LANDING GEAR WITH AT LEAST ONE MOTORIZED WHEEL CONFIGURED TO BE POSITIONED CLOSE TO AND REMOTE FROM LANDING GEAR STRUT

CROSS REFERENCE TO RELATED APPLICATIONS

This application is a National Stage of International Application No. PCT/EP2021/065620, filed Jun. 10, 2021, claiming priority to French Patent Application No. 2006056, filed Jun. 10, 2020, the contents of each of which being herein incorporated by reference in their entireties.

The present invention relates to the field of aircraft landing gears provided with at least one motorised wheel and at least one braked wheel.

BACKGROUND OF THE INVENTION

Patent document FR3072943A1 describes a landing gear provided with an upper portion intended to be joined to a structure of the aircraft and a lower portion equipped with a bogie forming a beam and two axles carried at the ends of this bogie.

This landing gear comprises a strut connecting the upper portion and the lower portion. The two axles of the landing gear are perpendicular to the bogie.

The front axle is provided with a plurality of braked wheels and the rear axle is provided with at least one motorised wheel to enable the progression of the aircraft on the ground (taxiing). Each motorised wheel is thus arranged to transmit operating forces to the ground and each braked wheel is arranged to transmit the braking forces to the ground.

A damper actuator is connected on the one hand, to the bogie and on the other hand, to the strut to orient this bogie along a pitching movement and thus simultaneously move the braked and motorised wheels.

The distribution of the forces between the braked wheels at the front and the motorised wheels at the rear is difficult to control with this sole damper actuator coupled with the bogie and each motorised wheel can sustain accelerations causing significant impacts during the take-off and landing phases, which requires adopting significant margins on its sizing.

Object of the Invention

An object of the present invention is to propose a landing gear making it possible to limit the risk of damaging a motorised wheel at the time of the take-off and landing phases.

SUMMARY OF THE INVENTION

To this end, the invention relates to an aircraft landing gear having an upper portion intended to be joined to a structure of the aircraft and a lower portion provided with first and second axles, the first axle being provided with at least one braked wheel and the second axle being provided with at least one motorised wheel.

The landing gear according to this first aspect of the invention is mainly characterised in that it comprises a first actuator arranged to move one of the axles between a remote position and a close position with respect to said upper portion independently from the other of the axles, such that, in one of these remote and close positions, the wheels on said first and second axles can be simultaneously in contact with a running surface while in the other of these positions, each wheel on the first axle is in contact with the running surface while each wheel on the second axle remains at a distance from this running surface.

In other words, the first actuator is arranged to move one of said axles among said first or second axles with respect to the upper portion of the landing gear while the other of these axles among said first and second axles is kept stationary with respect to this upper portion.

Thanks to the invention, during all the taxiing phases of the aircraft on the running surface, it is certain that the aircraft is at least carried by the braked wheel(s) on the first axle while each motorised wheel on the second axle can be selectively moved with respect to the running surface by the first actuator.

As long as the taxiing conditions do not enable a contact of the motorised wheel on the running surface (for example, because the aircraft moves at a great speed), a distance can be kept between the motorised wheel and the running surface, only one braked wheel being able to come into contact with the running surface.

When the taxiing conditions so allow, it can be decided to actuate the first actuator to put the running surface in contact with each motorised wheel on the second axle in addition to each braked wheel on the first axle.

For the understanding of the invention:
a braked wheel is a wheel mechanically coupled with a brake to apply a torque opposing the rotation of this braked wheel with respect to the axle provided with this braked wheel (in this case, the first axle); and
a motorised wheel is a wheel mechanically coupled with an engine intended to selectively apply an engine torque rotating this motorised wheel with respect to the axle provided with this motorised wheel (in this case, the second axle).

During the landing, take-off or high-speed taxi phase, each motorised wheel of the landing gear according to the invention can be kept at a distance from the running surface.

Thus, thanks to the invention, it is possible to avoid the motorised wheel being subjected to an impact against the running surface at the time of landing or it being subjected to a too-high rotation speed during taxiing.

The motorised wheel can thus be protected against accelerations or high intensity impacts.

The invention also makes it possible to dispense with disengagement means of the motorised wheel with respect to the engine, since aircraft speed conditions can be chosen, required to bring the motorised wheel into contact with the ground.

The size of the motorised wheel can be adapted to the sole need of operating the aircraft (pulling or pushing the aircraft).

The motorised wheel/tyre assembly and the whole kinetic chain between this wheel and the engine is subjected to speeds and forces which are a lot lower than the braked wheels, which makes it possible to reduce the risks of damaging the motorised wheel.

Being able to distance the motorised wheel with respect to the running surface during braking phases, makes it possible to not degrade the braking performance.

It can also be considered that the movement of each at least one motorised wheel by the first actuator is synchronised with the aeroplane speed with a relaxed precision with respect to the precision normally required to manage a disengagement of the motorised wheel with its engine. The transmission error can be recovered by the flexibility and the sliding of the tyre of each motorised wheel.

Another advantage of the landing gear according to the invention is that it can be installed, as an option, on an existing aircraft landing gear, by adding a motorised wheel and a first actuator to it, making it possible to move it with respect to the upper portion of the landing gear without moving the braked wheel.

According to a preferred embodiment, the first actuator is arranged to move the second axle between the remote position and the close position with respect to said upper portion independently from the first axle.

The first axle is provided with at least one braked wheel and is not provided with any motorised wheel (any wheel on the first axle is a braked wheel).

The second axle is provided with at least one motorised wheel and is not provided with any braked wheel (any wheel on the second axle is a motorised wheel).

The invention also relates to an aircraft comprising at least one landing gear according to any one of the landing gear embodiments according to the invention. This aircraft is arranged to selectively adopt first and second aircraft configurations, distinct from one another.

In the first aircraft configuration, said at least one braked wheel on the first axle and said at least one motorised wheel on said second axle are simultaneously in contact with a running surface to enable the taxiing of the aircraft.

In the second aircraft configuration, said at least one braked wheel on the first axle is in contact with a running surface while said at least one motorised wheel on said second axle is away from this running surface, the passage of one of these aircraft configurations to the other of these aircraft configurations being done by actuation of said first actuator.

Such an aircraft benefits from the advantages associated with the landing gear according to the invention.

BRIEF DESCRIPTION OF THE DRAWINGS

Other features and advantages of the invention will clearly emerge from the description, which is made below, for information and in a manner which is not limiting at all, in reference to the accompanying drawings, wherein:

FIG. 4 is a front view of a portion of the landing gear according to the invention illustrating a second connection mode between a motorised wheel 4a and the second axle 4, in which the motorised wheel 4a and the engine are integrated to form a wheel engine, in this case the engine belonging to a propeller system assembly M1 which is included in the wheel 4a;

DETAILED DESCRIPTION OF THE INVENTION

Figure 1C:
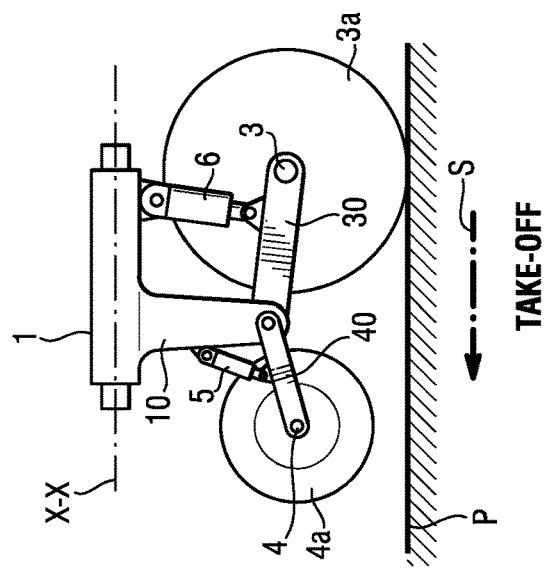
FIG. 1c is a side view of the landing gear 1 according to the invention which is in the take-off configuration where each motorised wheel 4a is away from the running surface P while each braked wheel is in contact with the surface P to support the aircraft, the aircraft is, in this case, in the so-called "TAKE-OFF" phase.
Figure 1B:
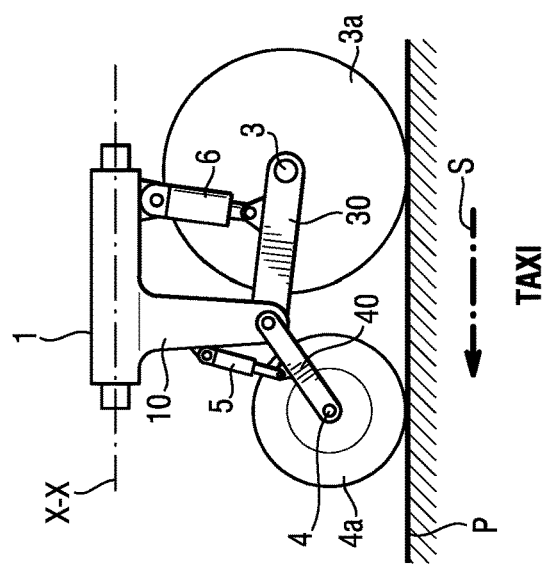
FIG. 1b is a side view of the landing gear 1 according to the invention while it is in a taxiing configuration where each of the motorised 4a and braked 3a wheel(s) is in contact with the running surface P, the aircraft is, in this case, in the so-called "TAXI" phase.
Figure 1A:
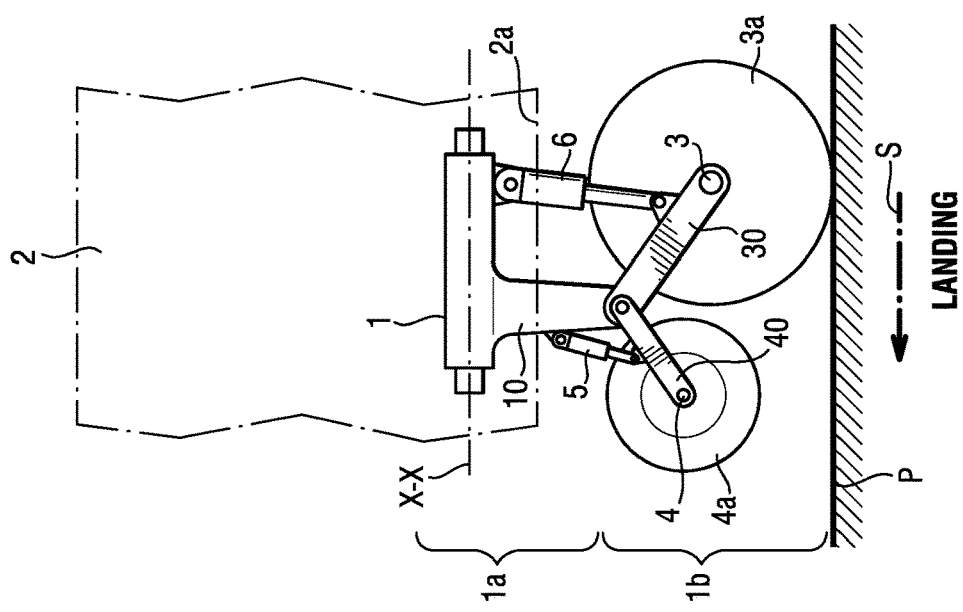
FIG. 1a is a side view of an aircraft portion 2 according to the invention, this aircraft comprising an aircraft structure zone 2a (illustrated as a dotted line only in this FIG. 1a) and a landing gear 1 according to the invention, an upper portion 1a of which is movably joined to this structure zone 2a, the landing gear 1 is, in this case, in a landing configuration where each braked wheel is in contact with the running surface P of the ground and where each motorised wheel 4a is close to the upper portion 1a to remain at a distance from the running surface P, the aircraft is, in this case, in the so-called "LANDING" phase.

The landing gear according to the invention is illustrated by FIGS. 1a, 1b, 1c, 2a, 2b, 2C which show different configurations adopted by the landing gear 1 during its use.

This landing gear 1 of an aircraft 2 comprises an upper portion 1a intended to be joined to a structure 2a of the aircraft 2.

A lower portion 1b of the landing gear 1 is provided with first and second axles 3, 4.

The first axle 3 is, in this case, a rear axle and the second axle 4 is, in this case, a front axle with respect to a usual movement direction S of the aircraft 2. This arrangement is advantageous, as it makes it possible to better control the load applied to the motorised wheel 4a.

The first axle 3 is provided with braked wheels 3a. The second axle 4 is provided with a motorised wheel 4a.

These first and second axles 3, 4 are parallel to one another, such that each wheel 3a on the first axle can rotate about a main axis of the first axle 3 and that each wheel 4a on the second axle 4 can rotate about a main axis of the second axle, these main axes of the first and second axles 3, 4 are parallel to one another.

Each braked wheel 3a can taxi over the running surface P and thus, on the one hand, support a portion of the weight of the aircraft 2 during landing, during the taxiing of the aircraft and during the take-off and, on the other hand, transmit a braking force of the aircraft when a brake associated with a braked wheel is actuated.

Each motorised wheel makes it possible to taxi over the running surface P and makes it possible to transmit a moving force of the aircraft (force causing the movement of the aircraft) when the motorised wheel is put in contact with the surface P and when the engine associated with this motorised wheel 4a is activated.

The landing gear 1 comprises a first actuator 5 arranged to move the second axle 4 between a remote position and a close position with respect to said upper portion 1a independently from the first axle 3.

In the remote position, the wheels 3a, 4a on the first and second axles 3, 4 are positioned to be simultaneously in contact with the running surface P.

In the close position, each wheel 3a on the first axle 3 is positioned to be able to be in contact with the running surface P while each wheel 4a on the second axle 4 is positioned to remain at a distance from this surface P.

As illustrated in FIGS. 1a to 2c, the landing gear 1 according to the invention is preferably a main landing gear of the aircraft.

Such a landing gear adopts a retracted configuration, in which it is placed in a zone of the structure 2a of the aircraft 2 and a deployed configuration, in which it extends under the aircraft 2 in order to be able to support it and enables it to taxi over the running surface P.

The landing gear is, in this case, connected to the structure 2a via a main pivot axis X-X of the landing gear, substantially parallel to the usual movement direction S of the aircraft.

Alternatively, the landing gear according to the invention could be connected to the structure 2a of the aircraft 2 via any other connection mechanism conventionally used.

The landing gear also comprises a main actuator (not represented) to control the passage of the landing gear (in this case, by pivoting the landing gear about the axis X-X) between its retracted configuration and its deployed configuration.

Each wheel 3a on the first axle 3 is a braked wheel 3a and each wheel 4a on the second axle 4 is a motorised wheel 4a.

The landing gear comprises a strut 10, an upper end of which belongs to the upper portion 1a of the landing gear 1 and a lower end of which belongs to the lower portion 1b of the landing gear.

An operating arm 40 is pivotably mounted with respect to this strut 10, in this case, via a pivot 41 located at the lower end of the strut 10.

The second axle 4 provided with the motorised wheel 4a is fixed on this operating arm 40 at a distance from the strut 10.

The first actuator 5 is, on the one hand, connected to the strut 10 and on the other hand, connected to said operating arm 40 to pivot this operating arm 40 with respect to the strut 10 and thus move the second axle between its remote position with respect to the upper portion 1a and its close position with respect to the upper portion 1a.

The landing gear also comprises a main arm 30 which is pivotably mounted with respect to the strut 10 via a pivot 41 located at the lower end of the strut 10.

This pivot 41 can be the same as that used for the pivoting mounting of the operating arm 40 with respect to the strut 10, but this could be another pivot.

The operating arm 40 is pivotably mounted with respect to the strut 10 to only enable a pitching movement of this operating arm 40.

Likewise, the main arm 30 is pivotably mounted with respect to the strut 10 to only enable a pitching movement of this main arm 30.

A pitching movement is a rotation movement about a transverse axis of the landing gear which, during taxiing, is parallel to the transverse axis of the aircraft 2.

The first axle 3 is fixed to the main arm 30, at a distance from the strut 10.

A main damper 6 is, on the one hand connected (via a first pivot connection) to the strut 10 and on the other hand, connected (via a second pivot connection) to said main arm 30 to dampen a pivot movement of this main arm 30 with respect to the strut 10 and thus dampen movements of the first axle 3 with respect to the strut 10.

Thus, the movement of the first axle 3 is dampened by the main damper 6 which, on the one hand, enables the strut 10 to belong to a dampened suspended portion of the damper and, on the other hand, to the motorised wheel 4a and to the first actuator 5 to be joined to this suspended portion of the landing gear.

The equipment which is fixed to the suspended portion is thus protected from vibrations caused during the taxiing of the braked wheels 3a.

Preferably, the first axle 3 is provided with at least two braked wheels 3a.

Preferably, these braked wheels 3a are arranged on either side of the main arm 30.

To simplify the side views of the landing gear according to the invention illustrated in FIGS. 1a, 1b, 1c, 2a, 2b, 2c, the braked wheel normally concealing the main arm 30 has been omitted. It must be noted that the number of braked wheels 3a and their arrangements on the first axle 3 could vary without moving away from the scope of the present invention.

In this case, the second axle 4 extends mainly from a side of the operating arm 40 where the only motorised wheel 4a of the landing gear is located.

It can however be considered that this second axle 4 is provided with several motorised wheels, the number and the arrangement of which could vary without moving away from the scope of the invention.

In particular, there could be two motorised wheels respectively placed on either side of the operating arm 40.

It must be noted that generally, each motorised wheel 4a is associated with an engine M which corresponds to it and which enables its drive, but it can also be considered that a motorised wheel is driven by several engines or conversely, that one same engine drives several motorised wheels.

Preferably, the engine for driving a motorised wheel 4a is an electric engine M powered by an electric power unit belonging to the aircraft.

Figure 3:
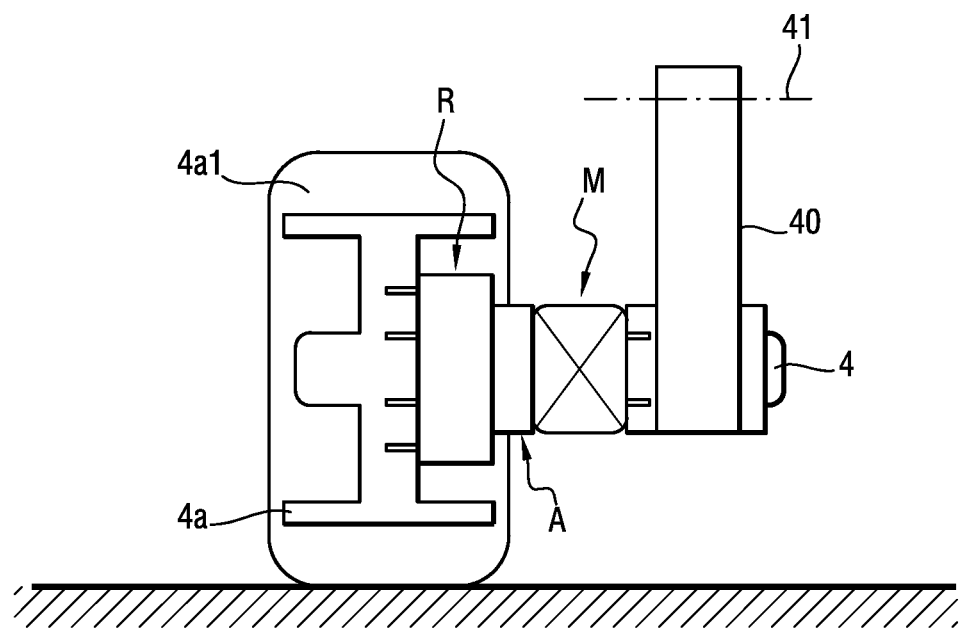
FIG. 3 is a front view of a portion of the landing gear according to the invention illustrating a first connection mode between a motorised wheel 4a and the second axle 4, in which the motorised wheel 4a is connected to the engine M which drives it via a transmission impact damper A (this type of damper with tangential springs makes it possible to filter certain variations in the transmission torque between the engine and the motorised wheel 4a) and via a speed reducer R transmitting the torque of the engine M to the wheel 4a so as to rotate it with a rotation speed less than the rotation speed of the engine M.

As illustrated in FIG. 3, an engine M can be mounted outside of the motorised wheel 4a with a kinetic chain between the engine M and the wheel 4a which is fully supported by the second axle 4, the engine M being located at a distance from the wheel 4a, between the operating arm 40 and the wheel 4a.

Figure 4:
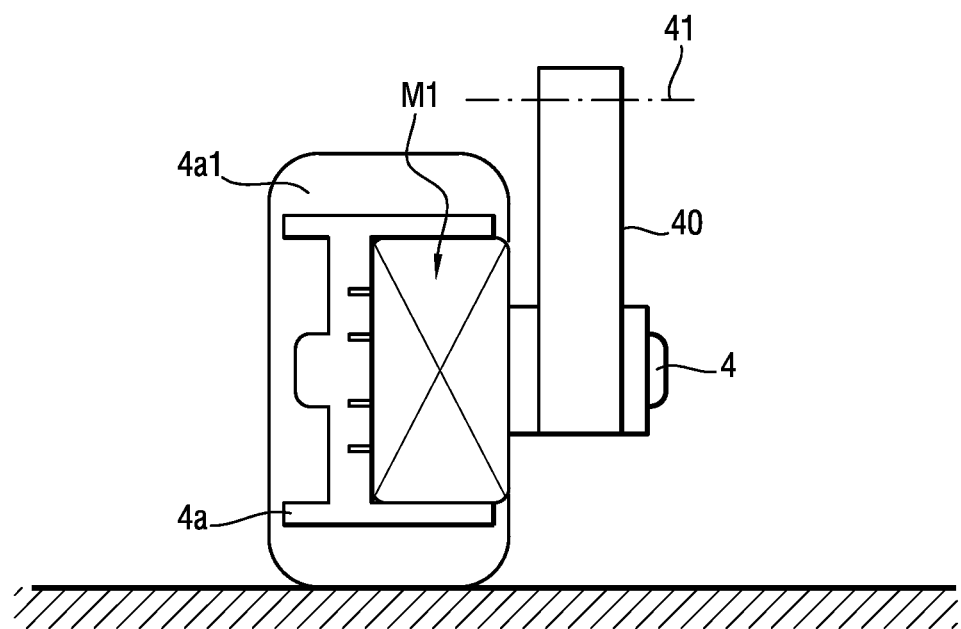

Alternatively, as illustrated in FIG. 4, the engine can be integrated with the wheel. In this embodiment, the engine belongs to a propeller system assembly M1 mainly placed in the wheel 4a, at a distance from the tyre 4a1.

Preferably, the first actuator 5 comprises a first damper 51 interposed between the operating arm 40 and to the strut 10 so as to dampen a pivot movement of the operating arm 40 with respect to the strut 10.

Figure 2A:
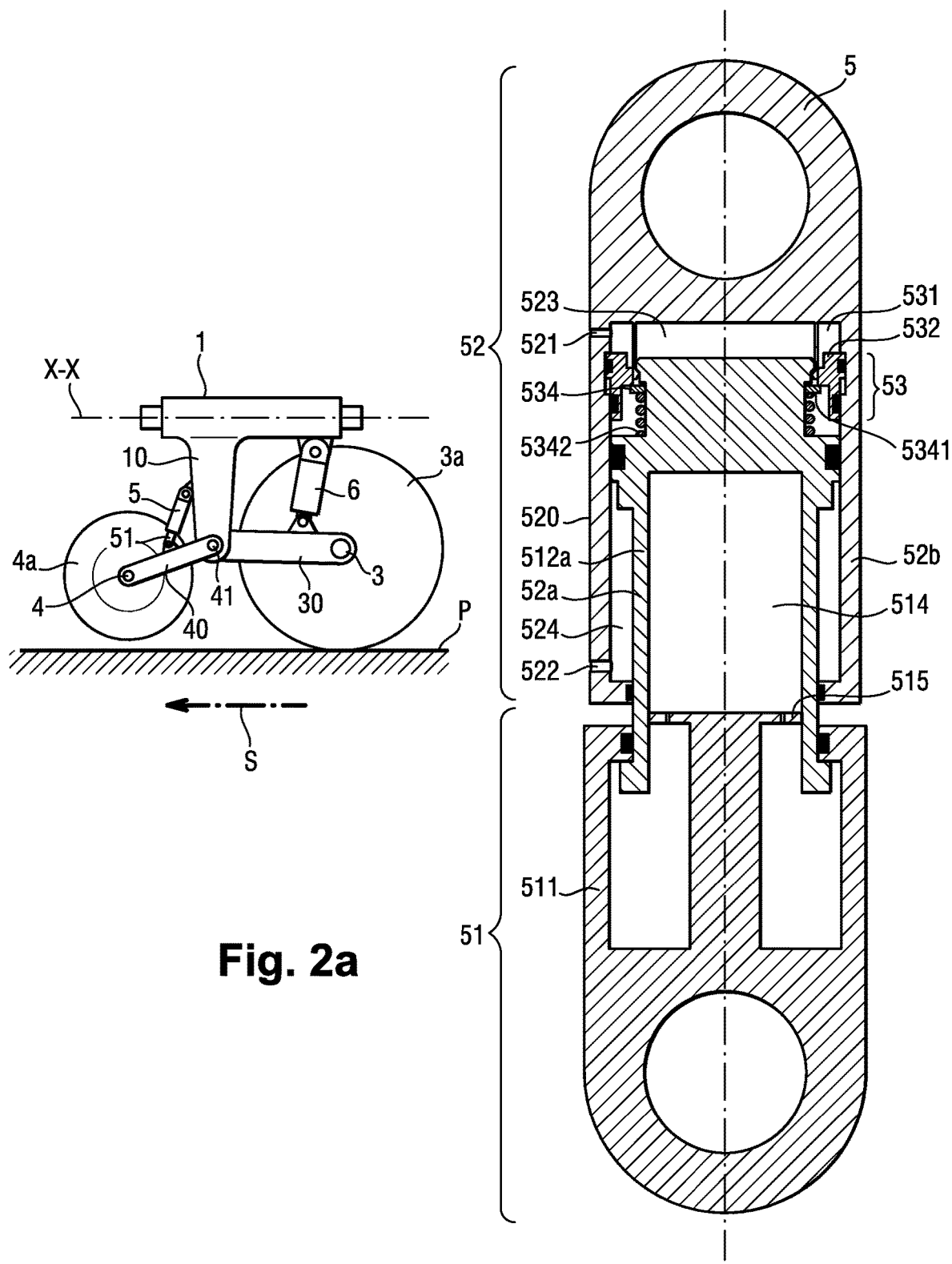
FIG. 2a is a side view of the landing gear 1 according to the invention, associated with a longitudinal cross-section of the first actuator 5 while the landing gear is in the landing configuration where only the braked wheels 3a are put in contact with the running surface P while each motorised wheel 4a is away from this surface P.
Figure 2B:
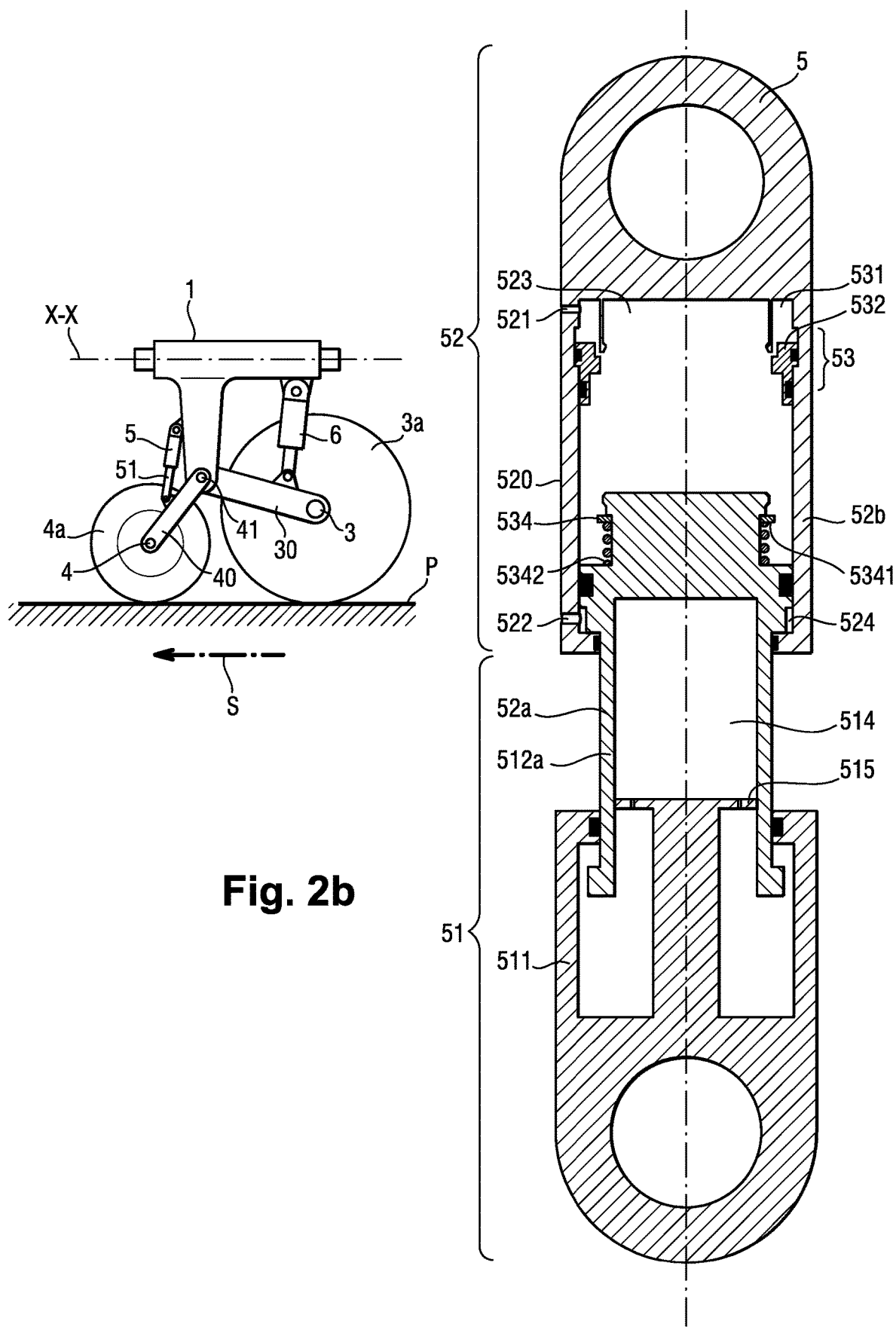
FIG. 2b is a side view of the landing gear 1 according to the invention, associated with a longitudinal cross-section of the first actuator 5 while the landing gear 1 is in a taxiing configuration (in a speed range which is compatible with the motorised wheel use to operate the aircraft), in this configuration, each motorised wheel 4a and each braked wheel 3a is in contact with the running surface P and the damper 51 of the first actuator 5 is extended, slightly compressed, the landing gear being in minimum static load.
Figure 2C:
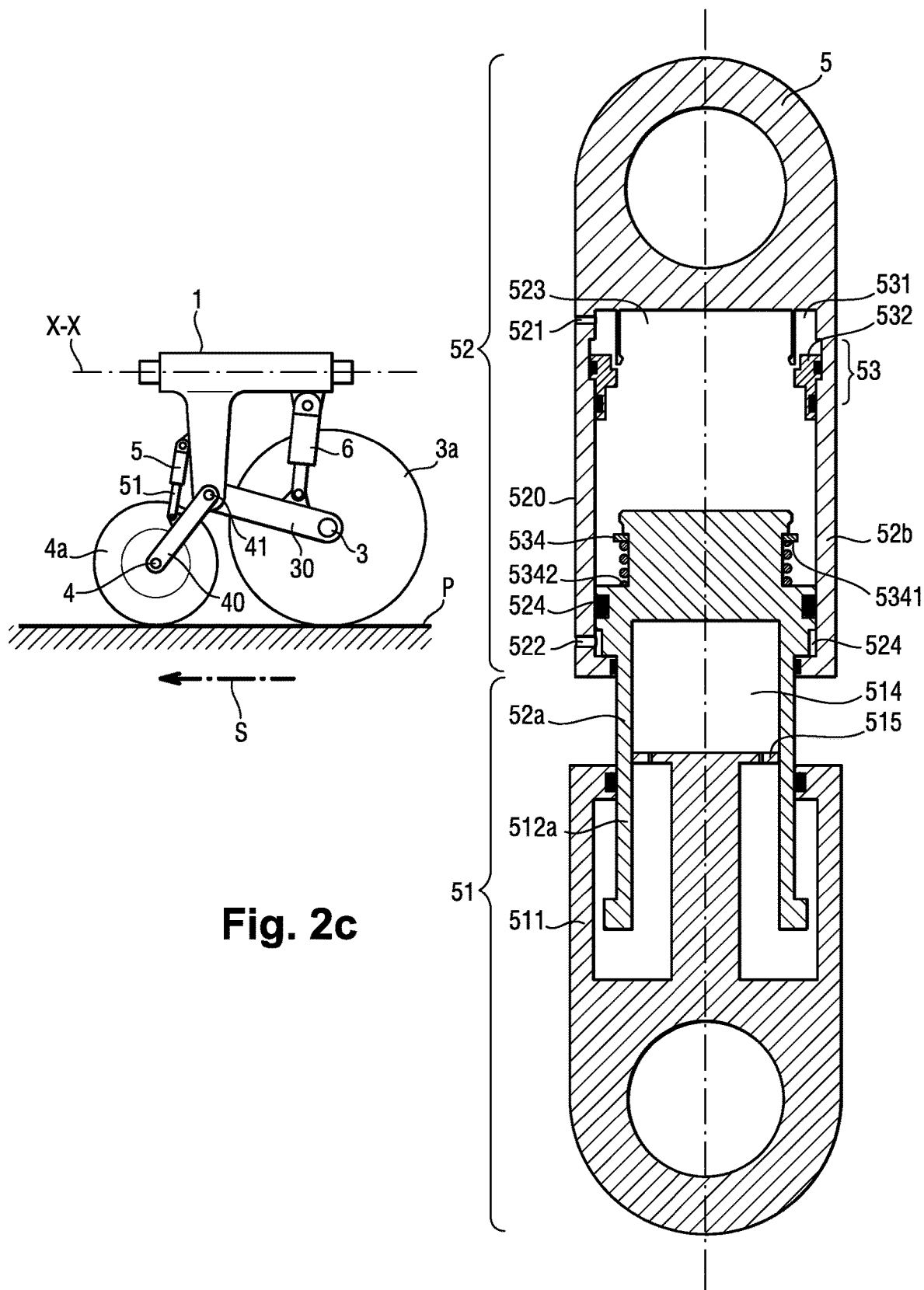
FIG. 2c is a side view of the landing gear 1 according to the invention, associated with a longitudinal cross-section of the first actuator 5 while the landing gear 1 is in taxiing configuration (in a speed range which is compatible with the motorised wheel use to move the aircraft), in this configuration, each motorised wheel 4a and each braked wheel 3a is in contact with the running surface P, the damper 51 of the first actuator 5 is, in this case, more highly compressed, as the landing gear is in maximum static load.

As is understood from FIGS. 2a to 2c, this first damper 51 is provided with first and second parts 511, 512 slidingly mounted against one another and together defining first and second damper chambers 513, 514 which are separated from one another by a movable wall 515 of the first damper 51.

This movable wall 515 is, in this case, defined by a portion of the first sliding part 511 which forms a piston sealingly sliding in a cylinder 512a defined in the second part 512.

These first and second chambers 513, 514 of the first damper 51 have respective internal volumes which vary according to a sliding position of the movable wall 515 of the damper with respect to the second sliding parts 512 of the first damper 51.

Alternatively, the movable wall 515 which delimits the two chambers 513, 514 could be defined by a portion of the second sliding part 512 which would form a piston sealingly sliding in a cylinder defined in the first part 511.

The movable wall 515 is equipped with at least one passage connecting the chambers 513, 514 together to enable a passage of fluid from one of these chambers to the other of these chambers in order to dampen the movement of the first and second parts 511, 512 against one another.

The first actuator 5 also comprises a telescopic jack 52 of variable length to make the orientation of the operating arm 40 vary with respect to the strut 10.

The telescopic jack 52 of the first actuator is a hydraulic actuator provided with a first port 521 for the passage of hydraulic fluid.

The length of this jack 52 is variable according to a volume of hydraulic fluid taken into this actuator 52 via this first port 521 for the passage of hydraulic fluid.

The telescopic jack 52 of the first actuator 5 comprises a first jack rod 52a and a first cylinder 52b.

The first jack rod 52a is sealingly slidingly mounted in this first cylinder 52b so as to define a main chamber 523 wherein said port 521 for the passage of hydraulic fluid leads.

The first jack rod 52a and the first cylinder 52b together defining a secondary chamber 524 in which a second port for the passage 522 of hydraulic fluid leads.

This telescopic hydraulic jack 52 is a double-acting jack of variable length between a minimum length and a maximum length.

Its minimum length is reached when the first jack rod 52 is abutted against a first abutment formed inside the main chamber 523.

Its maximum length is reached when the first jack rod is abutted against a second abutment formed inside the secondary chamber 524.

The increase in the length of this jack 52 is achieved by intaking fluid to the main chamber 523 via the first port 521 and by backflow of fluid outside of the secondary chamber 524 via the second port 522.

The decrease in the length of this jack 52 is achieved by intaking fluid to the secondary chamber 524 via the second port 522 and by backflow of fluid outside of the main chamber 523 via the first port 521.

The aircraft 2 comprises a hydraulic circuit (not represented) provided with a conduit for supplying highly pressurised hydraulic fluid connected to a hydraulic pump and a conduit for returning low pressure fluid relative to said high pressure.

The aircraft 2 also comprises a hydraulic distribution system (not represented) connected to the first and second ports of the jack 521, 522 and to the supply and return conduits to selectively adopt:

at least one configuration for extending the length of the jack 52 in which the first port 521 is connected to the supply conduit and the second port 522 is either preferably connected to the return conduit, or connected to the first port 521; and at least one configuration for reducing the length of the jack in which the second port is connected to the supply conduit and the first port is connected to the return conduit.

According to a particular embodiment, it could be provided that the hydraulic distribution system can adopt a configuration for immobilising the jack in which the circulation of fluid via the first and second ports 521, 522 would be prohibited.

This jack which, in case of hydraulic supply defect, for example in case of a drop in hydraulic pressure in at least one of its chambers below a predefined minimum value, would automatically return to an actuator length 52 in which the motorised wheel 4a is away from the running surface P. To this end, the actuator of FIGS. 2a, 2b, 2c could be provided with an elastic return means (not illustrated) exerting an elastic force opposing the extension of the jack 52.

The first actuator 5 also comprises a locking system 53 selectively adopting a locked configuration and an unlocked configuration.

In its locked configuration, the telescopic jack 52 of the first actuator 5 is blocked to keep the second axle 4 in its close position with respect to said upper portion 1a of the landing gear.

In its unlocked configuration, the telescopic jack 52 is released to be able to move the second axle 4 between its close position with respect to the upper portion 1a of the landing gear and its remote position with respect to said upper portion 1a of the landing gear.

This locking system 53 is arranged to pass from its locked configuration to its unlocked configuration in response to an unlocking control.

In the present case, the unlocking control consists of an increase in pressure of the hydraulic fluid taken in via the first port for the passage of hydraulic fluid.

As will be understood below, the passage from the unlocked configuration to the locked configuration is done automatically during the retraction of the telescopic jack 52.

As illustrated in FIGS. 2a, 2b, 2c, the locking system 53 comprises claws 531 and a ring 532 that slides with respect to a body 520 of the telescopic jack 52 between a position for blocking the claws 531 and a position for releasing the claws 531.

This locking system 53 is arranged such that when it is in locked configuration (see FIG. 2a), the sliding ring 532 is thus in its position for blocking the claws 531 where it catches end portions of the claws 531 in a zone for receiving these ends of claws such that the claws thus caught oppose any variation in length of the telescopic jack 52.

This locking system 53 is also arranged such that when it is in unlocked configuration (see FIGS. 2b and 2c), the sliding ring 532 is thus in its position for releasing the claws 531 and the end portions of the claws 531 are thus free to be distanced from said zone for receiving ends of claws so as to enable a variation in length of the telescopic jack 52.

The sliding ring 532 of the locking system 53 is, in this case, disposed so as to pass from its position for blocking the claws 531 to its position for releasing the claws under the effect of an increase in pressure of hydraulic fluid inside the main chamber 53 beyond a predetermined minimum pressure threshold.

The first rod 52a of the jack 52 carries an elastically deformable abutment 534 intended to abut against the sliding ring 532 of the locking system 53 when the telescopic jack 52 is retracted and has a running length less than a predetermined length value from which the elastically deformable abutment 534 is put into contact with the ring 532.

In this case, the elastically deformable abutment 534 is constituted by a washer 5341 slidingly mounted around an end zone of the first jack rod 52 and by a spring 5342, also mounted around this end zone of the first rod.

This spring 5342 pushes this washer 5341 in the direction of the sliding ring 532.

The first rod 52a comprises an end protrusion against which the washer 5341 abuts under the effect of the spring 5342 while this washer 5341 is kept at a distance from the sliding ring 532 of the locking system.

Thus, when the jack retracts, and when the rod 512 of the jack 52 approaches the stroke end, the claws 531 are initially housed in the zone for receiving these ends of claws which is, in this case, partially formed by an annular groove of the rod 512 then, secondly, the elastically deformable abutment 534 carried by the jack rod 512 comes into contact with the ring 532 and pushes the ring 532 to its position for blocking the claws.

The ends of the claws 531 are thus blocked in the zone for receiving the claws, the ring 532 thus abutting against these ends of the claws to prohibit the exiting outside of the zone for receiving the claws.

When the hydraulic pressure in the chamber 523 passes the predetermined threshold, the ring 532 which is sealingly sliding is moved to its position for releasing the claws 531 and it is distanced from the claws which can thus freely exit from the zone for receiving the claws, so as to enable the sliding of the rod 512 and the expansion of the jack 52.

Thanks to these claws 531, each motorised wheel 4a carried by the second axle is secured at a distance from the running surface and only a voluntary action for increasing the pressure in the chamber 523 makes it possible to release the claws and enable the movement of the operating arm 40 by the first actuator 5 in order to force the motorised wheel against the running surface.

The damper 51 of the first actuator 5 is shaped to exert a return force, forcing this damper to return to an extended configuration of the damper 51.

This first actuator 5 is arranged such that when the motorised wheel is in contact with the running surface, the damper 51 is thus compressed and exerts an elastic force opposing this compression. Thus, the motorised wheel 4a is forced in the direction of the ground P which improves the friction of the wheel on the ground and makes it possible to improve the transmissible engine force of the motorised wheel 4a.

The aircraft can also comprise a control unit of the landing gear which is connected to said hydraulic distribution system.

The first actuator 5 is preferably controlled via a control unit (not represented) such that as long as the speed of the aircraft 2 is greater than a predetermined speed threshold, this first actuator 5 applies a force tending to keep the second axle 4 in its close position with respect to said upper portion 1a of the landing gear 1.

Thus, as long as the speed of the aircraft is greater than the predetermined speed threshold, the motorised wheels 4a are necessarily away from the running surface P (ground) and only the braked wheel(s) 3a carried by the first axle 3 can come into contact with the running surface P.

The first actuator 5 is preferably controlled by the control unit, such that when the speed of the aircraft is less than the predetermined speed threshold, this first actuator 5 thus applies a force tending to keep the second axle 4 exclusively equipped with the motorised wheel in its extended position with respect to said upper portion 1a of the landing gear 1 (each motorised wheel carried by this second axle 4 thus being in contact with the running surface P and each braked wheel carried by the first axle 3 also being in contact with the running surface).

It must be noted that the main damper 6 could also comprise adjustment means controlled to make its length, its stiffness and/or its damping vary. Thus, the variation in length and/or stiffness and/or damping of the main damper could vary according to the speed of the aircraft.

Thus, as long as the speed of the aircraft is greater than the predetermined speed threshold, this main damper 6 could be controlled to apply a force on the main arm 30 tending to flatten the braked wheel 3a against the running surface P and to keep the strut 10 at a distance sufficiently away from the running surface P to guarantee that no motorised wheel 4a carried by the second axle 4 comes into contact with the running surface P.

However, as long as the speed of the aircraft 2 is less than the predetermined speed threshold and that the second axle 4 is located in its remote position with respect to the upper portion 1a, this main damper 6 and the first actuator 5 could be controlled to press the motorised and braked wheels on the running surface P and thus adjust the distribution of the bearing forces of the aircraft, between the braked and motorised wheel(s).

In this manner, it can be guaranteed that at any moment during the taxiing of the motorised and braked wheels, each motorised wheel can transmit effective traction forces of the aircraft and that each braked wheel can support the aircraft, while transmitting effective braking forces.

The controlling of the first actuator 5, makes it possible to optimise the contact force to the ground applied by the motorised wheel during taxiing, and it consequently makes it possible to optimise the distribution of forces between motorised and braked wheel(s).

Generally, thanks to the invention, during taxiing, each braked wheel 3 on the first axle remains in contact with the running surface, while said at least one motorised wheel on the second axle is selectively put into contact with the running surface P or away from this running surface P according to which the running taxiing speed is adapted, or not, to the operation of the motorised wheel.

Thanks to the invention:
the tyre of each braked wheel and the diameter of each braked wheel can be adapted to meet the needs associated with the landing, braking, and take-off phases; while
the tyre of each motorised wheel and the diameter of each motorised wheel can be adapted to meet the sole needs of moving the aircraft, during taxiing ranges outside of the landing, high-power braking, and take-off phases.

The invention is not limited to the examples described above and it comprises any variant within the scope defined by the claims.

Figure 5A:
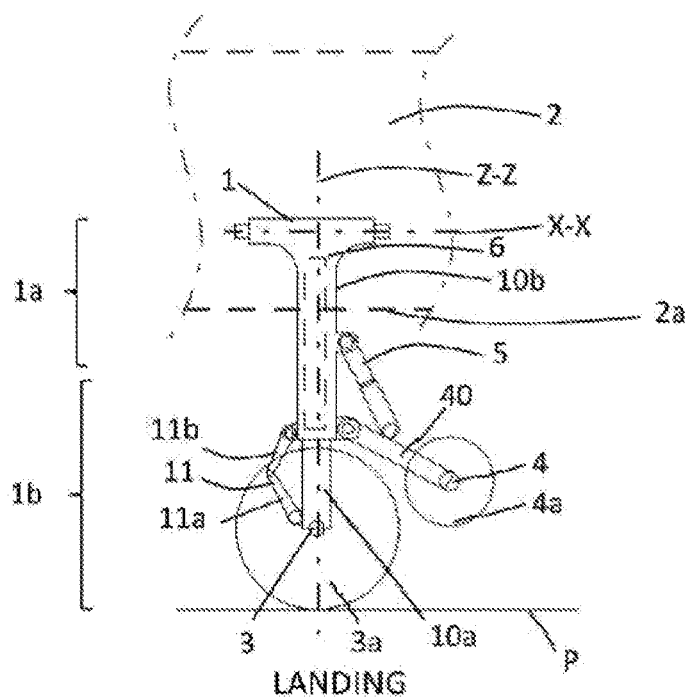
FIG. 5a is a side view of an aircraft portion 2 according to a second embodiment of the invention, this aircraft 2 comprising an aircraft structure zone 2a (illustrated as a dotted line only in this FIG. 5a) and a landing gear 1 according to the second embodiment of the invention, an upper portion 1a of which is movably joined to this structure zone 2a, the landing gear 1 is, in this case, in landing configuration where each braked wheel is in contact with the running surface P of the ground and where each motorised wheel 4a is close to the upper portion 1a to remain at a distance from the running surface P, the aircraft is, in this case, in the so-called "LANDING" phase.
Figure 5B:
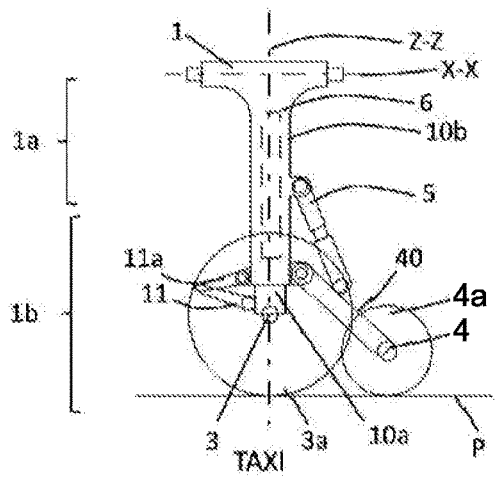
FIG. 5b is a side view of the landing gear 1 according to the second embodiment of the invention, while it is in its taxi configuration where each of the motorised 4a and braked 3a wheel(s) is in contact with the running surface P, the aircraft is, in this case, in the so-called "TAXI" phase.
Figure 5C:
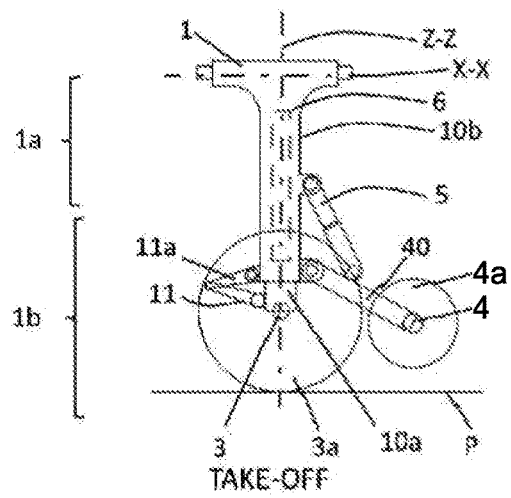
FIG. 5c is a side view of the landing gear 1 according to the second embodiment of the invention, this landing gear being in take-off configuration where each motorised wheel 4a is away from the running surface P while each braked wheel 3a is in contact with the surface P to support the aircraft, the aircraft is, in this case, in the so-called "TAKE-OFF" phase.

In the embodiment of the landing gear 1 of the aircraft 2 illustrated in FIGS. 5*a*, 5*b*, 5*c*, the landing gear 1 always has an upper portion 1*a* intended to be joined to a structure 2*a* of the aircraft 2 and a lower portion 1*b* provided with first and second axles 3, 4. The first axle 3 is always provided with at least one braked wheel 3*a* and the second axle 4 is always provided with at least one motorised wheel 4*a*.

The landing gear 1 always comprises a first actuator 5 arranged to move the second axle 4 between a remote position and a close position with respect to the upper portion 1*a* independently from first axles 3 such that:
in one of said positions, illustrated in FIG. 5*b*, the wheels 3*a*, 4*a* can be simultaneously in contact with a running surface P while;
in the other of said positions, illustrated by FIG. 5*a* or 5*b*, each wheel 3*a* on the first axle 3 is in contact with the running surface P, while each wheel 4*a* on the second axle 4 remains at a distance from this running surface P.

The landing gear of FIGS. 5*a*, 5*b*, 5*c* comprises a strut 10 formed of a lower portion 10*a* carrying the first axle 3 and an upper portion 10*b* intended to be connected to the structure 2*a* of the aircraft.

The upper portion 10*b* of the strut 10 belongs to the upper portion 1*a* of the landing gear 1 and the lower portion 10*a* of the strut belongs to the lower portion 1*b* of the landing gear.

These lower and upper portions 10*a*, 10*b* of the strut 10 slide against one another along a longitudinal axis Z-Z of the strut 10 and a main damper 6 is disposed to dampen the relative sliding of the lower portion 10*a* of the strut 10 with respect to the upper portion 10*b*.

The upper portion 10*b* of the strut comprises a landing gear casing and the lower portion 10*a* comprises a sliding rod carrying the first axle 3, this rod sliding inside the casing.

An operating arm 40 carrying the second axle 4 is rotatably mounted on the upper portion 10*b* of the strut 10, the first actuator 5 controlling the orientation of this operating arm 40 with respect to the strut 10.

The operating arm 40 is pivotably mounted with respect to the strut 10 to only enable a pitching movement of this operating arm 40.

The first actuator 5 is always, on the one hand, connected to the strut 10 and, on the other hand, connected to said operating arm 40 to pivot this operating arm 40 with respect to the strut 10 and thus move the second axle 4 between its remote position with respect to the upper portion 1*a* and its close position with respect to the upper portion 1*a*.

This first actuator 5 is, in this case, identical to that illustrated in FIGS. 1*a* to 2*c*.

In this variant of FIGS. 5*a* to 5*c*, the second axle 4 and the motorised wheel(s) 4*a* are carried by the operating arm 40 according to what has been presented above in reference to FIGS. 1*a* to 4.

However, contrary to the embodiment illustrated in FIGS. 1*a* to 4 where the first axle 3 is carried by the main arm 30, in FIGS. 5*a*, 5*b*, 5*c*, the first axle 3 is directly joined to the lower portion 10 of the strut 10, in this case, on the sliding rod.

Finally, in this embodiment of FIGS. 5*a* to 5*c*, a compass is used to enable the sliding of the lower portion 10*a* with respect to the upper portion 10*b*. This compass 11 comprises upper 11*b* and lower 11*a* arms hinged against one another.

The upper arm 11*b* is pivotably mounted on the upper portion 10*b* via an upper axis and the lower arm 11*a* is pivotably mounted on the lower portion 10*a* via a lower axis, these upper and lower axes being parallel to one another.

The invention can comprise other embodiments, in particular, although the locking system 53 presented above comprises claws, it could alternatively comprise locking segments, translationally moveable to alternatively lock the actuator and prohibit the movement of the second axle 4 with respect to the upper portion 1*a* of the landing gear or unlock the actuator and enable the movement of the second axle 4 with respect to the upper portion 1*a*.

To this end, the locking system can comprise segments slidingly mounted transversally with respect to the body of the telescopic jack 52 and a movable part with respect to this body 520 of the actuator between a position for blocking the segments and a position for releasing the segments.

The locking system 53 is, in this case, arranged such that:
when it is in the locked configuration, the movable part is thus in its position for blocking the segments where it pushes end portions of the segments in a zone for receiving these segment ends such that the segments thus pushed oppose any variation in length of the telescopic jack 52; and such that
when it is in the unlocked configuration, the movable part with respect to the body 520 of the actuator 52 is thus in its position for relating the segments and the end portions of the segments being free to be distanced from said zone for receiving the segment ends so as to enable a variation in length of the telescopic jack 52.

The invention claimed is:

1. A landing gear for an aircraft, the landing gear comprising:
an upper portion intended to be joined to a structure of the aircraft;
a lower portion provided with a first axle and a second axle, the first axle being provided with at least one braked wheel and the second axle being provided with at least one motorised wheel,
a first actuator arranged to move the second axle between remote and close positions with respect to the upper portion independently from the first axle such that, in the remote position, the at least one braked wheel and the at least one motorised wheel are configured to be simultaneously in contact with a running surface, and while in the close position, each of the at least one braked wheel on the first axle is in contact with the running surface while each of the at least one motorised wheel on the second axle remains at a distance from the running surface; and a strut having an upper end belonging to the upper portion of the landing gear and a lower end belonging to the lower portion of the landing gear and an operating arm, the operating arm being pivotably mounted with respect to the strut, said second axle provided with the at least one motorised wheel being fixed on the operating arm at a distance from the strut, wherein the first actuator is connected to the strut and to the operating arm to pivot the operating arm with respect to the strut and to move the second axle between the remote position of the second axle with respect to the upper portion and the close position of the second axle with respect to the upper portion, and wherein the first actuator comprises a first damper interposed between the operating arm and the strut so as to dampen a pivot movement of the operating arm with respect to the strut.

2. The landing gear according to claim 1, wherein the first actuator comprises a telescopic jack of variable length to make an orientation of the operating arm vary with respect to the strut.

3. The landing gear according to claim 2, wherein the first actuator comprises a locking system selectively adopting a locked configuration and an unlocked configuration, wherein, in the locked configuration, the telescopic jack of the first actuator is blocked to keep the second axle in the close position of the second axle with respect to said upper portion of the landing gear, and wherein, in the unlocked configuration, the telescopic jack being released to be able to move the second axle between the close position of the second axle with respect to the upper portion of the landing gear and the remote position of the second axle with respect to said upper portion of the landing gear.

4. The landing gear according to claim 3, wherein the locking system is arranged to pass from the locked configuration to the unlocked configuration in response to an unlocking control.

5. The landing gear according to claim 3, wherein the locking system comprises:
  claws; and
  a sliding ring that slides with respect to a body of the telescopic jack between a position for blocking the claws and a position for releasing the claws,
  wherein the locking system is arranged such that:
    when the locking system is in the locked configuration, the sliding ring is in the position for blocking the claws where the sliding ring catches end portions of the claws in a zone for receiving the end portions of the claws such that the claws oppose any variation in length of the telescopic jack; and
    when the locking system is in the unlocked configuration, the sliding ring is in the position for releasing the claws and the end portions of the claws are free to be distanced from said zone for receiving the end portions of claws so as to enable a variation in length of the telescopic jack.

6. The landing gear according to claim 2, wherein the telescopic jack of the first actuator is a hydraulic cylinder provided with a first port for passage of hydraulic fluid, the length of the telescopic jack being variable according to a volume of hydraulic fluid taken into the actuator via the first port for the passage of hydraulic fluid.

7. The landing gear according to claim 6, wherein the telescopic jack of the first actuator comprises a first jack rod and a first cylinder, the first jack rod being sealingly slidingly mounted in the first cylinder so as to define a main chamber in which said first port for the passage of hydraulic fluid leads.

8. The landing gear according to claim 7, wherein the first jack rod and the first cylinder together define a secondary chamber in which a second port for the passage of hydraulic fluid leads, the telescopic hydraulic jack of the first actuator being a double-acting cylinder of variable length.

9. The landing gear according to claim 1, further comprising:
  a main arm, the main arm being pivotably mounted with respect to the strut, said first axle provided with the at least one braked wheel being fixed to the main arm at a distance from the strut,
  a main damper being connected to the strut and to said main arm to dampen a pivot movement of the main arm with respect to the strut and thus-dampen movements of the first axle with respect to the strut.

10. The landing gear according to claim 1, wherein the strut is formed of a lower portion carrying said first axle and an upper portion, the upper portion of the strut belonging to the upper portion of the landing gear and the lower portion of the strut belongs to the lower portion of the landing gear, said lower and upper portions of the strut sliding against one another along a longitudinal axis of the strut and a main damper being disposed to dampen the relative sliding of the lower portion with respect to the upper portion and said operating arm being rotatably mounted on said upper portion of the strut.

11. The gear according to claim 1, wherein the first axle is a rear axle and the second axle is a front axle with respect to a direction of movement of the aircraft.

12. An aircraft comprising at least one of the landing gear according to claim 1, wherein the aircraft is arranged to selectively adopt a first aircraft configuration and a second aircraft configurations, distinct from one another,
  in the first aircraft configuration, said at least one braked wheel on the first axle and said at least one motorised wheel on said second axle being simultaneously in contact with a running surface to enable the taxiing of the aircraft,
  in the second aircraft configuration said at least one braked wheel on the first axle is in contact with a running surface while said at least one motorised wheel on said second axle is distanced from the running surface, the passage from one of the first aircraft configurations and the second aircraft configuration to the other of the first aircraft configuration and the second aircraft configuration being done by actuation of said first actuator.

\* \* \* \* \*